R. DE FILIPPIS.
DIRIGIBLE HEADLIGHT.
APPLICATION FILED JAN. 21, 1919.
1,324,655.
Patented Dec. 9, 1919.
2 SHEETS—SHEET 1.
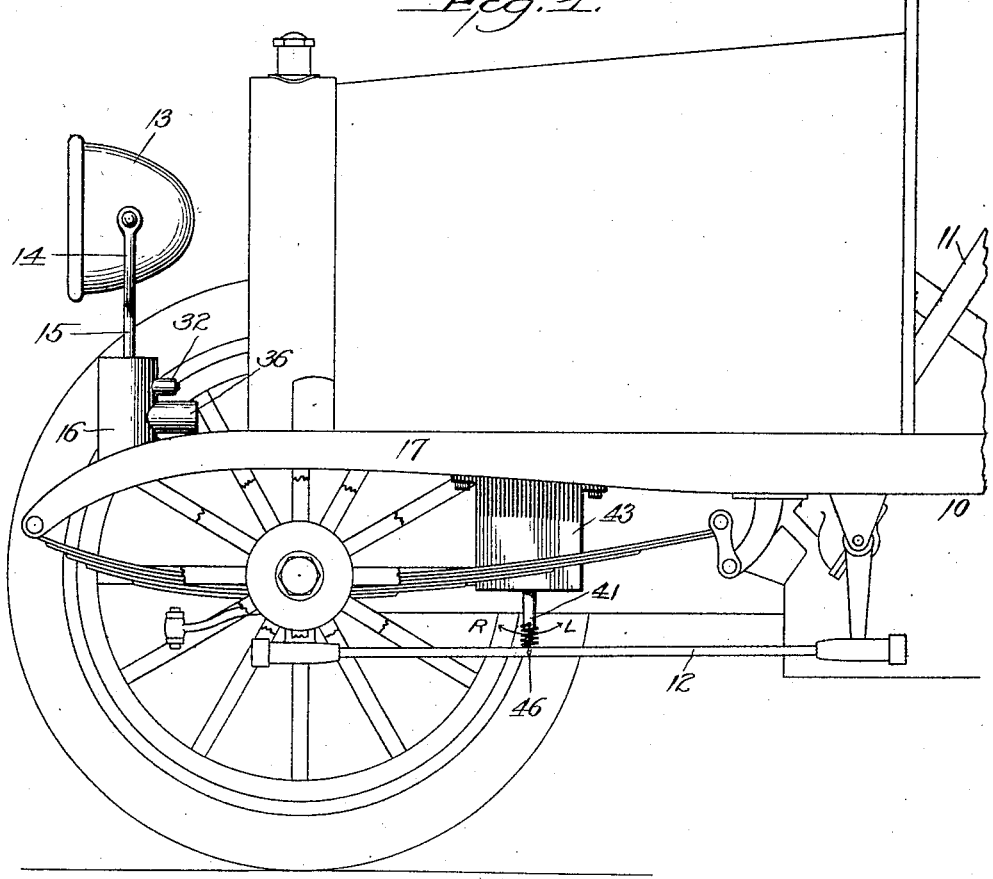
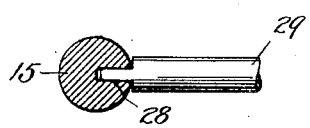
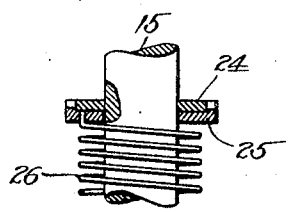
WITNESSES
INVENTOR
RAYMOND DE FILIPPIS
BY
ATTORNEYS

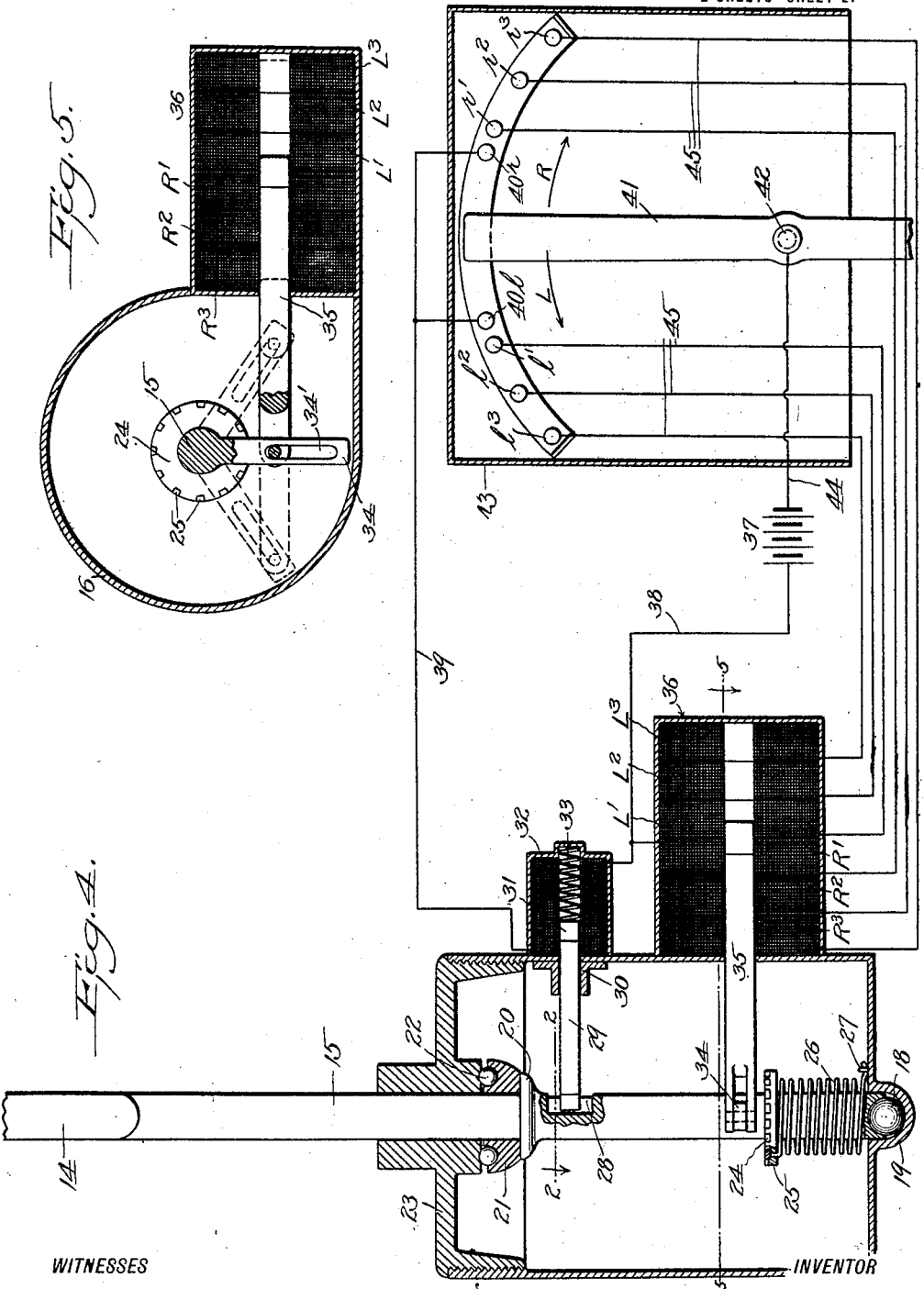

UNITED STATES PATENT OFFICE.

RAYMOND DE FILIPPIS, OF BROOKLYN, NEW YORK.

DIRIGIBLE HEADLIGHT.

1,324,655.  Specification of Letters Patent.  Patented Dec. 9, 1919.

Application filed January 21, 1919. Serial No. 272,365.

*To all whom it may concern:*

Be it known that I, RAYMOND DE FILIPPIS, a citizen of the United States, and a resident of the city of New York, borough of Brooklyn, in the county of Kings and State of New York, have invented a new and Improved Dirigible Headlight, of which the following is a full, clear, and exact description.

This invention relates to headlights and has particular reference to headlights or searchlights adapted particularly for use on road vehicles such as automobiles. I wish it to be understood, however, that I do not propose to be limited unnecessarily in the adaptation of my improvement to any particular vehicle or the like, certain features of the invention being useful in many relations.

Among the objects of the invention is to provide automatic means for turning or steering the headlight laterally coincidentally with the ordinary steering of the machine or vehicle so as to insure that the roadway will be illuminated properly in front of the vehicle irrespective of the turns that may occur.

Another object of the invention is to provide a headlight and supporting means for the same, including a vertical yoke having a shank adapted for rotation around a vertical axis, means being provided to prevent undesired lateral oscillation or vibration of the lamp due to possible idle turning of the support.

A still further object is to provide a vertical support for a headlight, the support being adapted to be caused to rotate more or less around a vertical axis, and means also acting initially to unlock the support to permit such lateral turning.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation showing the adaptation of my improvement to a vehicle in combination with the usual steering mechanism.

Fig. 2 is a transverse sectional detail on the line 2—2 of Fig. 4.

Fig. 3 is a detail view of the support for the headlight, and with reference especially to the adjustment of the means for automatically restoring the lamp to normal midposition so as to illuminate the roadway straight ahead of the vehicle.

Fig. 4 is a vertical longitudinal section of the actuating and controlling means for the headlight support, and also including a diagram of the electric connections; and Fig. 5 is a horizontal section on the line 5—5 of Fig. 4.

Referring now more specifically to the drawings I indicate at 10 a portion of a conventional automobile having a steering post 11, and any suitable rod 12 extending from the steering devices forward to the front axle.

13 is a headlight of any well known or approved design or construction mounted in a yoke 14 having a shank 15 journaled for rotation around a vertical axis in a casing 16 supported upon any suitable portion of the machine such as the frame 17. The lower end of the shank 15 has a step bearing at 18 in a pit 19 formed in the bottom of the casing 16. Adjacent to the upper end of the casing the shank is provided with a collar 20 carrying a bearing ring 21 for anti-friction rollers 22 coöperating with the cap portion 23 of the casing, thus insuring prompt turning action of the headlight.

Within the casing the shank is fitted with a collar 24, fixed thereto by any suitable means, and coöperating with the collar is a toothed collar 25 to which the upper end of a coil spring 26 is secured, while the bottom end of the spring is fixed at 27 to the bottom of the casing 16. The collar 24 may be provided with one or more peripheral teeth engaging between any selected teeth of the collar 25 whereby the proper tension of the spring may be determined and established. The tension of the spring serves to hold the collar 25 up in engagement with the fixed collar 24 to prevent accidental disengagement of the two collars, while the torsional function of the spring serves to tend to restore the headlight to normal mid-position after it has been turned around its axis in either direction.

Just below the shoulder 20 the shank is provided with a vertical notch 28 of any suitable shape in cross section which is adapted to receive the reduced end of a locking plunger 29 slidable radially with respect to the shank through a guide member 30 fixed to the rear wall of the casing 16 and having its outer end 31 serving as a movable core in a solenoid 32 fixed upon the rear of the casing. A spring 33 acts normally between the rear wall of the solenoid and the plunger when the solenoid is deënergized, to cause the point of the plunger to enter the notch 28 and thereby positively hold the headlight from rotation or vibration around a vertical axis.

The shank between the notch 28 and the fixed collar 24 is provided with an arm 34 shown as projecting from the left side of the shank in substantially the same vertical plane as the yoke 14. This arm is provided with a slot 34' through which a core 35 of a multiple solenoid 36 is connected to the arm.

The solenoid 36 comprises a plurality of sections shown as six in number and identified by the characters $L^1$, $L^2$, $L^3$, $R^1$, $R^2$, and $R^3$, signifying left and right turns respectively to different stages. The core 35 is so designed as to have its effective end lie normally at or about the plane of union between the windings $L^1$ and $R^1$ so as to be in position to be actuated by any winding for the movement of the lamp either to the right or to the left, and to any distance.

Any suitable means may be provided to control the circuits through these several windings. To this end I indicate diagrammatically a battery 37 representing any suitable source of electrical energy. From one side of the battery a conductor 38 leads to both of the solenoids 32 and 36. From the solenoid 32 a conductor 39 leads to a pair of contacts $40^l$ and $40^r$ spaced normally equally on opposite sides of a switch lever 41 pivoted at 42 within a switch casing 43 located at any convenient place between the connecting rod 12 and the bottom of the vehicle. A conductor 44 leads from the other side of the battery to the switch lever preferably through the pivot connection thereof. Arranged in the arc over which the end of the switch lever 41 is adapted to sweep are two sets of spaced contact points $l^1$, $l^2$, $l^3$, $r^1$, $r^2$, and $r^3$ corresponding respectively to the several windings of the solenoid 36. Between each of these contact points and its windings is a conductor 45.

The operation of this device may be briefly summarized as follows in view of the specific description above set forth: When the vehicle is being operated in a forward direction the steering mechanism obviously is in mid-position and hence the switch lever 41, having flexible connection at 46 with the connecting rod 12, is likewise in mid and idle position as shown in Fig. 4, spaced from all contact points in the casing 43. At this time the headlight, yoke and shank are positively held locked free from vibration and causing the light therefrom to be projected forward. This locking of the shank is established by the action of the spring 33 forcing the plunger or core 29 forward into the notch 28, the solenoid 32 being deënergized at this time because of the space between the switch lever 41 and the nearest contacts. When the steering mechanism is actuated to turn the vehicle to the right or to the left the switch lever 41 is moved positively in a corresponding direction and to an extent corresponding to the sharpest turn of the vehicle. If for example the machine is being turned to the right the lever 41, Fig. 4, is likewise moved to the right and soon after it begins to so move the contact $40^r$ is bridged completing a circuit through the solenoid 32 whereby with the energizing of this solenoid the plunger 29 is withdrawn from the notch 28 unlocking the headlight support. Almost immediately thereafter and while the contact $40^r$ is yet bridged the contact $r^1$ will be bridged, energizing the winding $R^1$ causing thereby a forward projection of the core 35 and a movement of the arm 34 in a clockwise direction as in Fig. 4. Likewise a continued movement of the switch lever in the same direction will bring the remaining contacts on the same side into action in succession, each succeeding contact being bridged momentarily by the contact lever in connection with the next preceding contact point so as to insure the overlapping of the action of the two adjacent windings in the main circuit 36. This fact insures first that there shall be no dead point between any two of these windings while the switch lever 41 is moving, and secondly the core 35 is in effect delivered from each of the inner windings to the outer windings in succession after the switch lever leaves the contact $40^r$ and obviously the solenoid 32 is deënergized thereby permitting the spring 33 to snap the plunger 29 against the shank where it will be received upon the cylindrical surface thereof at one side of the notch 28 in position to be forced into the notch when the headlight is returned to normal position by the action of the spring 26 and the release or deënergization of the solenoid 36.

I claim:

1. In a device of the class set forth, the combination with a headlight and supporting means therefor serving to hold the headlight projected normally forward and providing for the rotation of the headlight in either direction to the right or to the left, a locking member serving to lock the support in normal position, and electric means acting automatically to first release the locking means and then to cause the rotation of the headlight in either direction and to an extent corresponding to the direction and extent of turning of the vehicle steering devices, said electric means comprising two distinct magnets, a battery common to both magnets, two circuits running to the respective magnets, and a single switch coöperating with the independent circuits in succession, first to energize the releasing magnet and immediately thereafter to energize the rotating magnet.

2. In a dirigible headlight, the combination of a headlight, a supporting and controlling device therefor, an electromagnet, means connecting the electromagnet with the supporting device to cause the same to rotate around a vertical axis, a bolt serving to hold the supporting device from rotation a magnet associated with the bolt, a battery, independent circuits from the battery to the respective magnets, an arc-shaped series of contacts having successive engagement with the magnet first mentioned, the circuit for the second magnet having a single contact associated with the aforesaid series of contacts, and a switch blade operating over the series of contacts passing first over the single contact and causing the energizing of the bolt magnet for releasing the supporting device, said switch serving to bridge said single contact and the first of the series of contacts and then subsequently serving to bridge adjacent contacts of the series while the circuit becomes broken through the bolt magnet.

RAYMOND DE FILIPPIS.